(12) United States Patent
Fletcher et al.

(10) Patent No.: US 7,216,805 B2
(45) Date of Patent: May 15, 2007

(54) METHODS AND APPARATUS FOR COUNTING AND POSITIONING USING RESONANT TAGS

(75) Inventors: Richard Fletcher, Cambridge, MA (US); Olufemi Omojola, Dorchester, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 79 days.

(21) Appl. No.: 10/625,789

(22) Filed: Jul. 23, 2003

(65) Prior Publication Data

US 2004/0212549 A1 Oct. 28, 2004

Related U.S. Application Data

(60) Provisional application No. 60/398,303, filed on Jul. 23, 2002.

(51) Int. Cl.
*G06F 19/00* (2006.01)

(52) U.S. Cl. ............... 235/385; 235/383; 235/436; 235/493; 380/571

(58) Field of Classification Search .............. 235/385, 235/436, 435; 340/571, 673
See application file for complete search history.

(56) References Cited

U.S. PATENT DOCUMENTS

| | | | |
|---|---|---|---|
| 4,862,160 A | 8/1989 | Ekchian et al. | 340/825.54 |
| 5,028,745 A | 7/1991 | Yamanami et al. | 178/19 |
| 5,841,350 A * | 11/1998 | Appalucci et al. | 340/572.3 |
| 5,942,991 A | 8/1999 | Gaudreau et al. | 340/870.16 |
| 6,020,849 A | 2/2000 | Fukuzaki | 342/374 |
| 6,239,789 B1 | 5/2001 | Sekizawa et al. | 345/173 |
| 6,301,763 B1 | 10/2001 | Pryor | 29/407.04 |
| 6,639,514 B1 * | 10/2003 | Muller | 340/572.5 |
| 6,732,923 B2 * | 5/2004 | Otto | 235/383 |

* cited by examiner

*Primary Examiner*—Seung Ho Lee
(74) *Attorney, Agent, or Firm*—Norma E. Henderson

(57) ABSTRACT

Methods and apparatus for counting or measuring the relative positions of a number of resonant tag elements in proximity to each other. By measuring the resonant frequency of a given set of tags using a reader antenna and comparing the measured frequency to a reference resonant frequency, the observed frequency shift is used to ascertain certain properties of the set of tags, such as the number of tags present or the relative positions thereof.

50 Claims, 8 Drawing Sheets

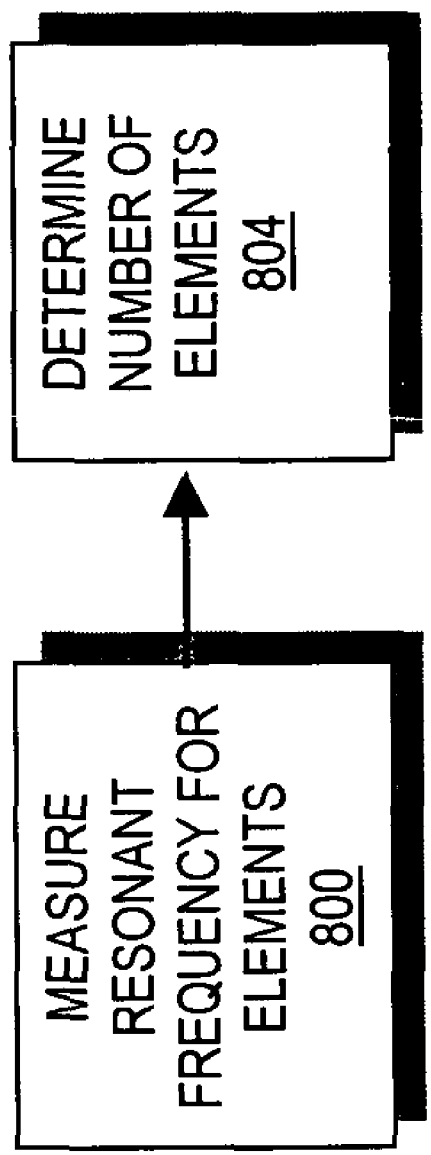

METHODS AND APPARATUS FOR COUNTING AND POSITIONING USING RESONANT TAGS

CROSS-REFERENCE TO RELATED APPLICATIONS

The present application claims the benefit of provisional application No. 60/398,303, filed on Jul. 23, 2002, the entire disclosure of which is incorporated by reference as if set forth in its entirety herein.

FIELD OF THE INVENTION

The invention relates to electronic sensing and tracking, and, in particular, to the use of resonant tags for counting items and determining their relative position.

BACKGROUND OF THE INVENTION

Various technologies are known for monitoring the position or relative position of an object or group of objects. One technology equips an implement with a tuned circuit and places the implement in proximity to a tablet having coils extending in two coordinate directions. The tablet coils are sequentially excited with AC energy having approximately the same frequency as the resonant frequency of the tuned circuit. The excitation causes the tuned circuit to interact with and change the AC current flowing in the coils of the tablet. The AC current flowing in the coils of the tablet changes as a function of the position of the tuned circuit and therefore, with the position of the implement, with the current experiencing the greatest changes in those coils closest to the implement. The changes in the current are measured and interpolated to determine the position of the implement. One version of this technology tracks at least two implements at the same time.

In some circumstances, the absolute location of an object is less important than its relationship to other objects. For example, various technologies are suited to counting the number of objects in a set of objects. For example, one approach equips each object with an easily-recognizable marker such as a bar code, a reflective tag, or a colored dot. Then, an automated vision system receives an image of the set and counts the number of markers in the image to determine the number of objects in the set. This system has its failings. For example, a marker on one object may be obscured by dirt or by another object. Changing the orientation of the object, e.g., such that the marker faces away from the camera, may render this system inaccurate or may otherwise hinder the operation of the system. Another approach utilizes scales calibrated to the weight of a single object, providing a count of the number of objects on the scale and their spatial location, but this approach may provide poor spatial resolution relative to the size of the object.

A need therefore exists for improved apparatus and methods capable of counting the number of objects in a set or determining the position or relative position of the objects in the set. In light of general public concern over privacy issues regarding electromagnetic tagging, it would be desirable to have a technology that provides automated counting and tracking functions without using electronic chips and individual ID numbers.

SUMMARY OF THE INVENTION

The present invention relates to methods and apparatus for counting or measuring the relative positions of a number of resonant tag elements in proximity to each other. By measuring the resonant frequency of a given set of tags using a reader antenna and comparing the measured frequency to a reference resonant frequency, the observed frequency shift is used to ascertain certain properties of the set of tags, such as the number of resonant elements present or the relative positions thereof.

In one aspect, the present invention provides a method for counting a set of resonant tags, each tag having at least one resonant element. A reference resonant frequency, $\omega_0$, that is common to the tags is provided and the resulting resonant frequency of the set of interacting tags, $\omega$, is measured. The number of resonant elements in the set, n, is determined using the measured frequency and the reference frequency. The reference resonant frequency may be measured or computed from the known geometry or the physical dimensions of a tag.

Each tag may include one or more resonant elements, and, in one embodiment, each tag is identical to the other tags of the set. In a further embodiment, the set of tags has multiple subsets of resonant elements, with each subset of resonant elements having its own resonant frequency.

Each tag may be affixed to a movable object. The set of tags may be arranged in a stack and, in one embodiment, pairs of adjacent tags in the stack have a substantially equal spacing.

Generally speaking, n is a monotonic function of the measured resonant frequency. In one embodiment, each tag present has an inductance, L, and the number of tags present is given by a value substantially equal to $$\sqrt{\frac{L^2(\omega^2-\omega_0^2)}{\omega^2 M^2}}+1,$$

where M is the mutual inductance between the individual tags.

The reference frequency, $\omega_0$, may be provided using several techniques in accord with the present invention. In one embodiment, the reference frequency is provided as a regression-fit function to a plurality of empirical measurements of the number of tags in a test set and the resonant frequency of the test set. In another embodiment, the reference frequency is provided as a value determined from at least one measurement of a single tag. In still another embodiment, the reference frequency is provided as a value determined from at least one measurement of a plurality of tags. In yet another embodiment, the reference frequency is provided as a value computed from the known geometry and dimensions of each tag in the set.

In another aspect, the present invention provides a method for determining the separation between a pair of tags, each tag having at least one resonant element. A reference resonant frequency, $\omega_0$, that is common to the tags is provided and the resulting resonant frequency of the pair of interacting tags, $\omega$, is measured. The separation between the pair of tags is determined using the measured frequency and the reference frequency. The separation determined may be a lateral distance or an axial distance. Each tag in the set is typically affixed to a movable object.

The reference resonant frequency, $\omega_0$, may be determined using several techniques in accord with the present invention. In one embodiment, the reference frequency is provided as a regression-fit function to a plurality of empirical measurements of the separation between a test pair of tags and the resonant frequency of the test pair. In another embodiment, the reference frequency is provided as a value determined from at least one measurement of a single tag. In still another embodiment, the reference frequency is provided as a value determined from at least one measurement of a plurality of tags. In yet another embodiment, the reference frequency is provided as a value computed from known parameters of a resonant element in the set.

In one embodiment, determining the separation between the pair of elements includes determining the mutual inductance between the pair of tags and determining the value of the separation using the mutual inductance.

In still another aspect, the present invention provides an apparatus for counting a set of tags, each tag having at least one resonant element. A source provides at least one reference frequency, $\omega_0$, common to all tags and a sensor measures the resultant resonant frequency of the set of the interacting tags, $\omega$. A computational element determines the number of tags in the set, n, using the measured frequency and the reference frequency. The reference resonant frequency may be measured or computed from the known geometry or physical dimensions of a tag.

Each tag may include one or more resonant elements and, in one embodiment, each tag is identical to the other tags of the set. The set may have multiple subsets of resonant elements, with each subset of resonant elements having its own resonant frequency.

Each tag in the set is typically affixed to a movable object. The set of tags may be arranged in a stack and, in one embodiment, pairs of adjacent tags in the stack have a substantially equal spacing.

Generally speaking, n is a monotonic function of the measured resonant frequency. In one embodiment, where each resonant element has an inductance, L, the number of tags present is given by a value substantially equal to $$\sqrt{\frac{L^2(\omega^2 - \omega_0^2)}{\omega^2 M^2}} + 1,$$

where M is the mutual inductance between the individual tags.

The reference resonant frequency, $\omega_0$, may be provided using several techniques in accord with the present invention. In one embodiment, the reference frequency is provided as a regression-fit function to a plurality of empirical measurements of the number of tags in a test set and the resonant frequency of the test set. In another embodiment, the reference frequency is provided as a value determined from at least one measurement of a single tag. In still another embodiment, the reference frequency is provided as a value determined from at least one measurement of a plurality of tags. In yet another embodiment, the reference frequency is provided as a value computed from known parameters of a resonant element in the set.

In yet another aspect, the present invention provides an apparatus for determining the separation between a pair of tags. The apparatus includes a source providing at least one reference resonant frequency, $\omega_0$, common to the tags and a sensor for measuring the resulting resonant frequency of the pair of interacting tags, $\omega$. A computational element determines the separation between the pair of tags using the measured frequency and the reference frequency. The separation may be a lateral distance or an axial distance. Each tag in the set is typically affixed to a movable object.

The reference frequency, $\omega_0$, may be provided using several techniques in accord with the present invention. In one embodiment, the reference frequency is provided as a regression-fit function to a plurality of empirical measurements of the separation between a test pair of tags and the resonant frequency of the test pair. In another embodiment, the reference frequency is provided as a value determined from at least one measurement of a single tag. In still another embodiment, the reference frequency is provided as a value determined from at least one measurement of a plurality of tags. In yet another embodiment, the reference frequency is provided as a value computed from known parameters of a resonant element in the set.

In one embodiment, determining the separation between the pair of elements includes determining the mutual inductance between the pair of tags and determining the value of the separation using the mutual inductance.

The foregoing and other features and advantages of the present invention will be made more apparent from the description, drawings, and claims that follow.

BRIEF DESCRIPTION OF THE DRAWINGS

The advantages of the invention may be better understood by referring to the following description taken in conjunction with the accompanying drawings in which:

FIG. 8 is a flowchart illustrating a method for determining the number of resonant tags in accord with the present invention.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

The present invention relates to methods and apparatus for counting or measuring the relative position of a number of resonant tag elements in proximity to each other. Each individual tag may possess one or more resonant frequencies. All of the tags in a set of tags have at least one resonant frequency in common, also known as a reference frequency. More specifically, the reference frequency is the value of this common frequency when a single tag is present and not subject to any perturbations caused by interactions with other tags in the set. If more than one tag is present, the tags will interact to produce a shift in the measured resonant frequency. This new measured frequency is then compared to the reference frequency, $\omega_0$, in order to ascertain the number of tags or the relative position of the tags in the set. In general, these tag elements are suited for attachment to fixed or movable objects and, therefore, may be used to determine various properties of the objects, such as their number and their lateral or axial separation.

The resonant tags described herein contain resonant elements and may be manufactured in the form of planar conductive foil structures that may be integrated into so-called "smart labels" or "smart packaging materials." By attaching these smart labels to objects such as, for example, playing cards, greeting cards or toys in a display rack, board games on a shelf, or candy wrappers in a snack vending machine, it is then possible to perform a variety of automated tasks such as real-time inventory management and positioning of objects in or above a machine. In one embodiment, the resonant elements are electromagnetic resonators, each having an inductance, L, and a capacitance, C. In some embodiments L and C may also be distributed physical quantities. The resonant elements may be in the form of a planar coil, for example.

Generally speaking, the methods and apparatus of the present invention use changes in measured resonant frequency (or frequencies) to ascertain certain information concerning a set of tags, such as the number of tags present or the relative position thereof. The relationship between the measured frequency and the parameters of interest can be determined through a series of empirical measurements, through the use of a baseline resonant frequency computationally determined from the tag's geometry, or through the use of a calibration measurement of an isolated tag or set of tags.

Derivation Using Circuit and Energy Models

Figure 1:
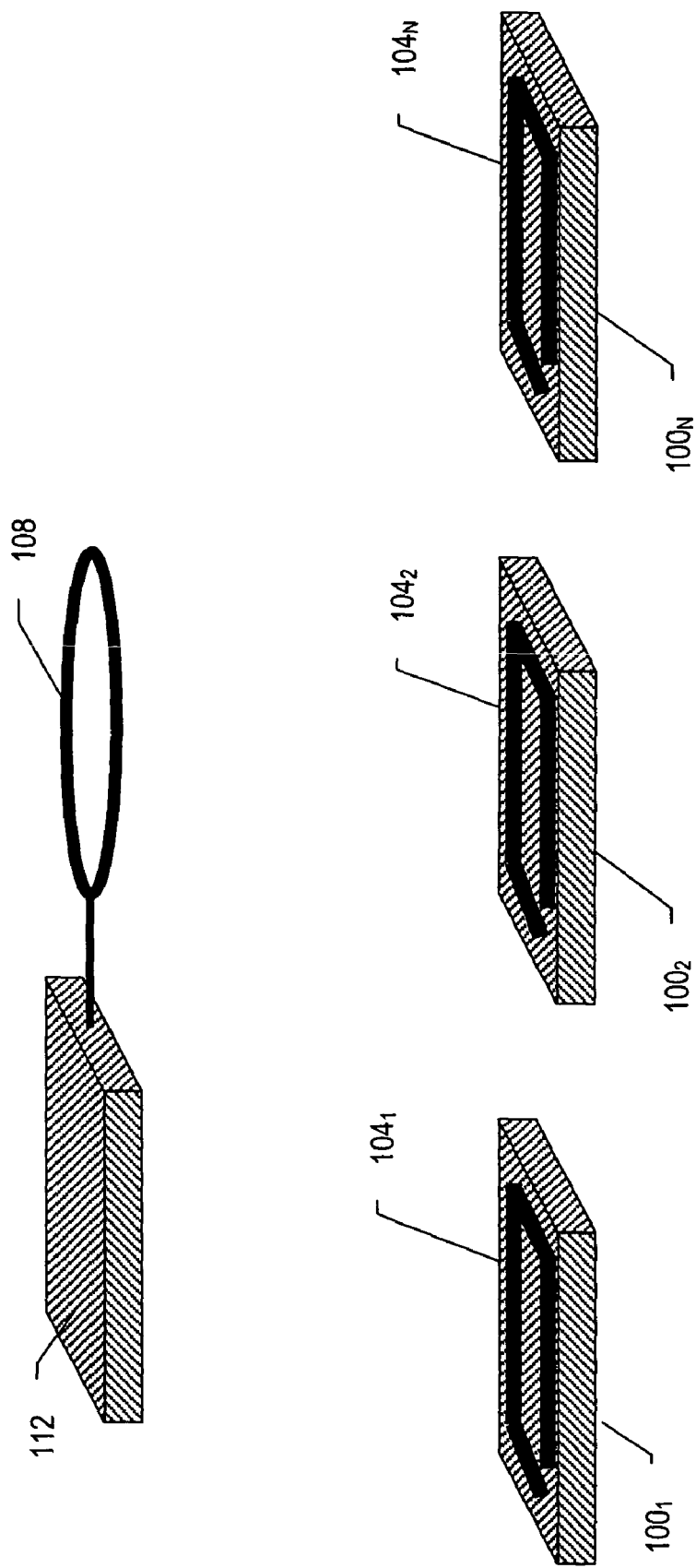
FIG. 1 depicts a reader module and reader antenna in proximity to a set of objects labeled with resonant tags in accord with present invention.

Referring to FIG. 1, in accord with the present invention, one or more objects $100_1$, $100_2$ (generally $100_N$) labeled with resonant tags $104_1$, $104_2$ (generally $100_N$) are placed within range of tag reader antenna 108. Of course, multiple antennae $108_N$ may be used to, e.g., provide failsafe backups but, to simplify discussion, it is assumed that there is only one antenna 108.

The antenna 108 is in communication with a reader module 112. The reader module 112 may communicate with an external network through wireless or physical connections, for example, using such protocols as RS-232, USB, Bluetooth, Infrared Data Association (IrDA), and WiFi (IEEE 802.11a/b). The reader module 112 typically includes a processor and a memory that executes programmed instructions. In some embodiments, the reader module 112 uses application-specific circuits or includes one or more special-purpose computers. In other embodiments, the reader module 112 is one or more general purpose computers executing software providing this functionality.

Figure 2:
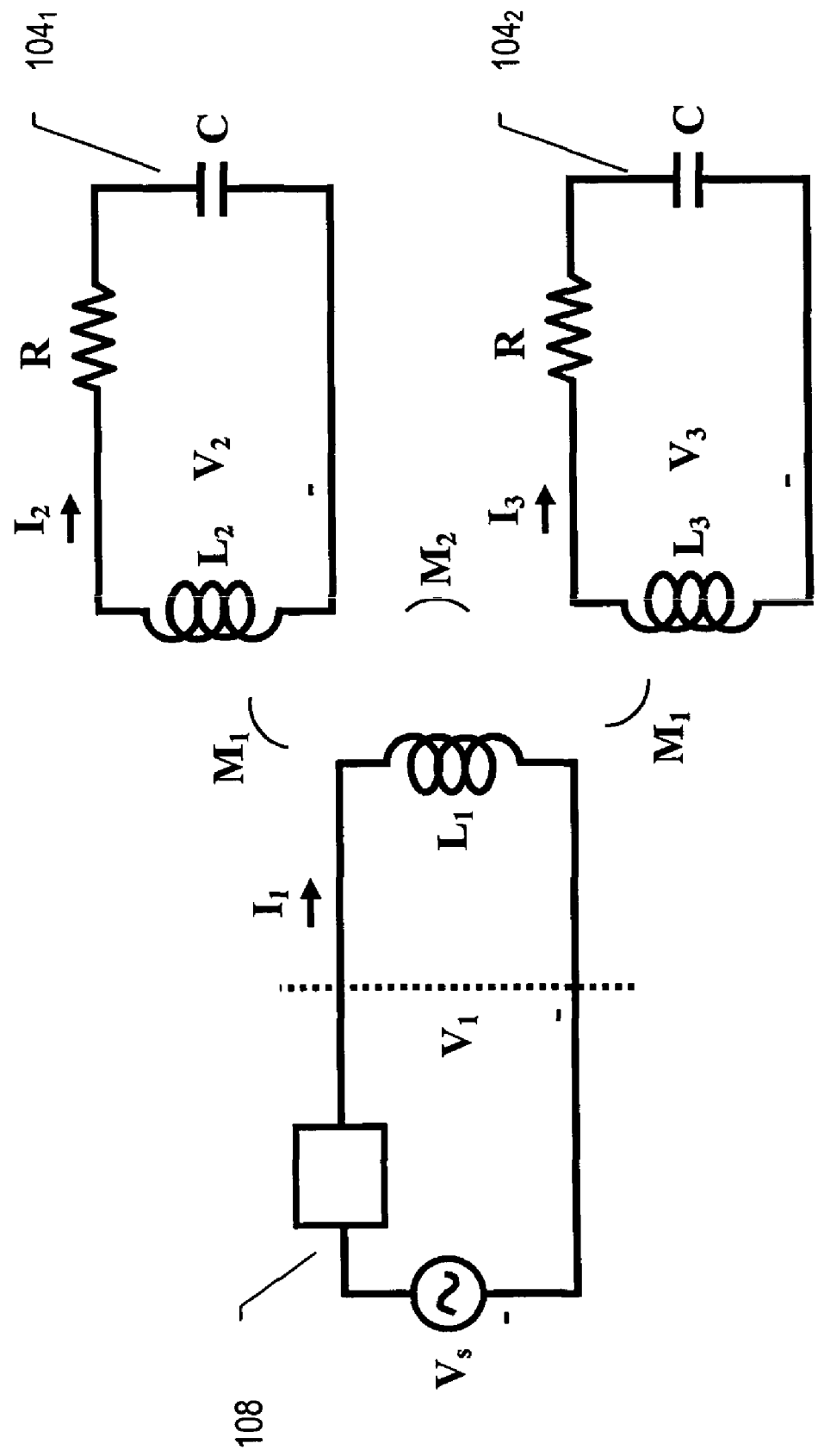
FIG. 2 depicts a circuit model representing a reader antenna and two adjacent tags, each tag having a single resonant element and being mutually inductive.

As shown in FIG. 2, the tag reader antenna 108 may be implemented or modeled as a coil having inductance, $L_1$, with voltage, $V_1$, and current, $I_1$. The resonant tags $104_1$, $104_2$ may be implemented or modeled as LRC circuits. That is, tag $104_1$ may be assumed to have an inductive component, $L_2$, a resistive component, $R_2$, and a capacitive component, $C_2$. Tag $104_1$ also has its own voltage, $V_2$, and current, $I_2$. Analogous considerations apply to tag $104_2$, i.e., tag $104_2$ is associated with parameters $L_3$, $R_3$, $C_3$, $V_3$, and $I_3$.

The antenna 108 is magnetically coupled to the resonant tags $104_1$, $104_2$, which are in turn magnetically coupled to each other. If the reader antenna 108 is considerably larger than the resonant tags $104_N$, such that the tags $104_N$ fit comfortably within the excitation field of the reader antenna 108, then the mutual inductance between the reader 108 and each of the tags $104_N$—which is denoted $M_1$—may be assumed to be the same for each of the tags $104_N$. This assumption is not necessary, but is made to simplify the following discussion. The mutual inductance between tag $104_1$ and tag $104_2$ is denoted as $M_2$, yielding the following system of equations:

$$V_1 = j\omega L_1 I_1 + j\omega M_1 I_2 + j\omega M_1 I_3 \quad \text{(Eq. 1)}$$

$$V_2 = -j\omega L_2 I_2 - j\omega M_1 I_1 + j\omega M_2 I_3 \quad \text{(Eq. 2)}$$

$$V_3 = -j\omega L_3 I_3 - j\omega M_1 I_1 + j\omega M_2 I_2 \quad \text{(Eq. 3)}$$

After substitution and simplification:

$$V_2 = I_2 \left( R + \frac{1}{j\omega C} \right) \quad \text{(Eq. 4)}$$

$$V_3 = I_3 \left( R + \frac{1}{j\omega C} \right) \quad \text{(Eq. 5)}$$

Reader module 112 measures the series impedance of the tag reader antenna 108 as influenced by its coupling with the tags $104_N$, which is defined to be $Z_1$. That is, $Z_1$ reflects the physical properties of the antenna 108 as well as any induced currents resulting from the proximity of the tags $104_N$. Assuming the presence of two tags $104_1$, $104_2$, then $Z_1$ may be written as:

$$Z_1 = j\omega I_1 + \frac{\omega^2 M_1^2 [Z_2 + Z_3 - 2j\omega M_2]}{\omega^2 M_2^2 + Z_2 Z_3} \quad \text{(Eq. 6)}$$

where $Z_2$ and $Z_3$ are shorthand representations for the series impedances of each of the tags represented as LRC circuits. That is, $Z_2 = R_2 + j\omega L_2 + 1/j\omega C_2$ and $Z_3 = R_3 + j\omega L_3 + 1/j\omega C_3$.

By expanding the impedance terms, this formula may be used to calculate the magnitude or phase of the measured signal. A simplified formula for the change in the resonant frequency is obtained by assuming that the tags $104_1$, $104_2$ are lossless and identical such that R = 0. The enumerated subscripts for the resistive, inductive, and capacitive components of the tags $104_1$, $104_2$ may be dropped, yielding the following formula:

$$Z_1 = j\omega L_1 + \frac{\frac{2\omega^4 M_1^2}{L^2}\left[\frac{1}{j\omega C} - M_2 j\omega + L j\omega\right]}{\left[\omega^2 - \omega_0^2\left(\frac{L^2}{L^2 - M_2^2}\right) + \omega_0^2\left(\frac{LM_2}{L^2 - M_2^2}\right)j\right]} \quad \text{(Eq. 7)}$$

$$\left[\omega^2 - \omega_0^2\left(\frac{L^2}{L^2 - M_2^2}\right) - \omega_0^2\left(\frac{LM_2}{L^2 - M_2^2}\right)j\right]$$

where $$\omega_0^2 = \frac{1}{LC}.$$

The resonant frequency, $\omega$, of the system occurs at the "poles" of Eq. 7, i.e., at the roots of the denominator where $Z_1$ has its local maxima:

$$\omega^2 = \omega_0^2 \left( \frac{L^2}{L^2 - M_2^2} \right) \quad \text{(Eq. 8)}$$

This result may be verified by assuming that $M_2=0$, i.e., by "turning off" the mutual inductance between tags. Then, the formula for the resonant frequency (Eq. 8) collapses to the familiar result:

$$\omega^2 = \omega_0^2 \equiv \frac{1}{LC}.$$

For larger numbers of tags $104_N$, it may be preferable to use an energy calculation to derive the shift in the collective resonant frequency of the tags $104_N$ in the field of the antenna 108. The reader antenna 108 may still be described with impedance $Z_1$, voltage $V_1$, and current $I_1$, but the total effective capacitance ($C_e$), inductance ($L_e$), and resistance ($R_e$) of the system as a whole may be expressed as:

$$C_e = \frac{I \cdot I^*}{4\omega_0^2 W_e} = \frac{|I|^2}{4\omega_0^2 W_e} \quad \text{(Eq. 9)}$$

$$L_e = \frac{4W_m}{I \cdot I^*} = \frac{4W_m}{|I|^2} \quad \text{(Eq. 10)}$$

$$R_e = \frac{2P_l}{I \cdot I^*} = \frac{2P_l}{|I|^2} \quad \text{(Eq. 11)}$$

where $P_1$ is the power lost and $W_e$ and $W_m$ are the stored electrical and magnetic energies of the system, respectively. The sum of $W_e$ and $W_m$ equals the total energy stored in the system.

At resonance, $W_e=W_m$ and the resonant frequency of the system, $\omega_0$, may be described in terms of the effective inductance and capacitance of the system:

$$\omega_0 = \frac{1}{\sqrt{L_e C_e}} \quad \text{(Eq. 12)}$$

For an inductively-coupled system, the number and relative position of the resonant tags $104_N$ changes the amount of magnetic energy, $W_m$, of the system. Consequently, as more tags $104_N$ are added to the system in potentially arbitrary orientations, the magnetic energy of the system increases or decreases in a measurable fashion. Thus, each additional tag $104_N$ contributes an amount of magnetic energy proportional to the current and the flux that pass through it. The magnetic energy of n coupled circuits is given by:

$$W_m = \frac{1}{2} \sum_{i=1}^{n} I_i \varphi_i \quad \text{(Eq. 13)}$$

Therefore, in accord with the present invention, it is possible to predict the shift in frequency based on the relative orientations of the tags and the reader antenna. As a particular tag $104_N$ is added to or moved in the field of reader antenna 108, the direction of the tag's induced field vector will determine whether its field will add or subtract from the total field of the system. Increasing the magnetic energy of the system will reduce the resonant frequency, while decreasing the magnetic energy will increase the resonant frequency.

By changing the relative position/orientation of the tags $104_N$—and therefore changing the magnitude and sign of the mutual inductance factors—it is possible to vary the observed resonant frequency over a range of values, even if all of the tags $104_N$ have identical resonant frequencies. If the mutual inductance between the reader antenna 108 and each tag $104_N$ is not equal for all tags $104_N$, then it is possible to increase the resonant frequency of some tags $104_N$ while decreasing the resonant frequency of other tags $104_N$. This may produce multiple resonances as manifested by several distinct resonant peaks.

Lateral Positioning

Figure 3:
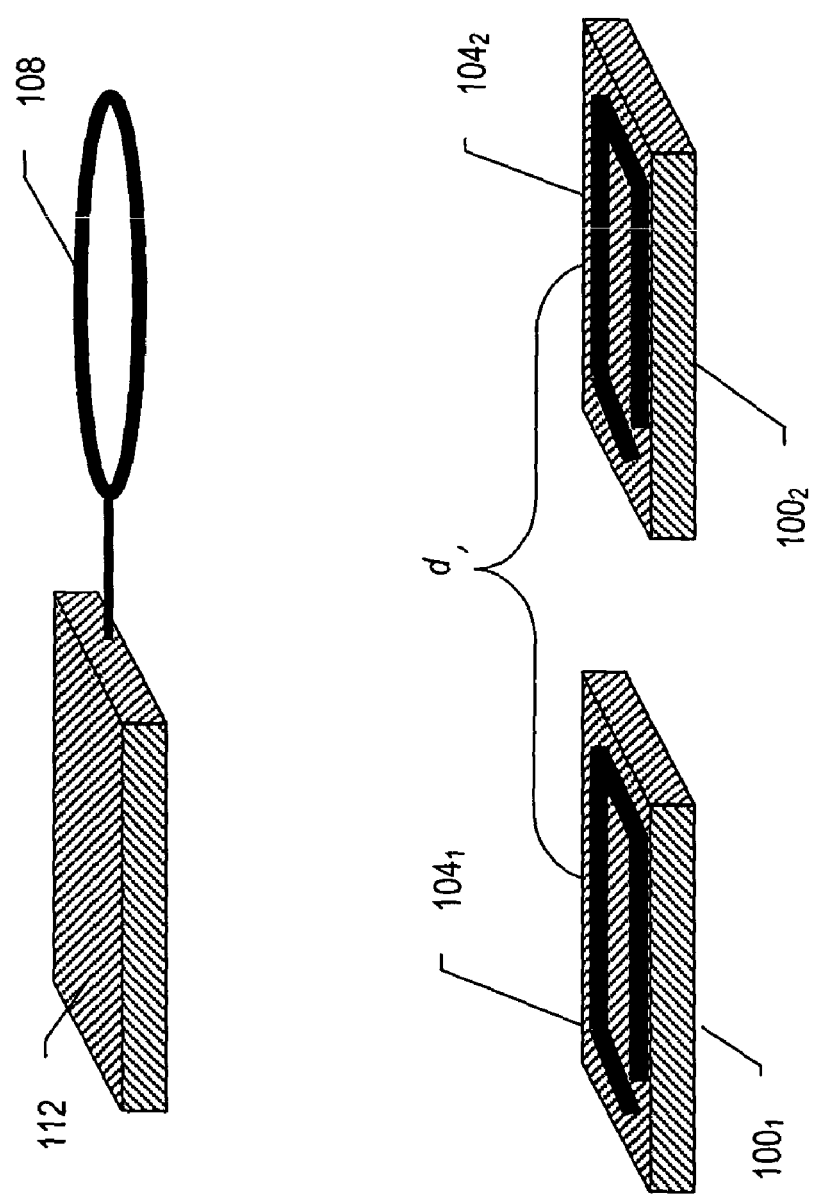
FIG. 3 illustrates an embodiment of the present invention utilizing an antenna to determine the lateral separation between a pair of objects labeled with resonant tags.

Referring to FIG. 3, the observed shift in resonant frequency may be used to determine the lateral separation, d, between two or more resonant tags $104_N$ that are in the excitation field of a reader antenna 108, for example, to determine the location of tagged pieces on a chessboard or to track the location of tagged objects in a manufacturing process. In this case, the mutual inductance, $M_2$, between the tags $104_1$, $104_2$ produces a magnetic flux that opposes the flux due to the mutual inductance, $M_1$, between the tags $104_N$ and the reader antenna 108. Thus, the difference of sign in the mutual inductance, $M_2$, produces an increase in the observed resonant frequency, $\omega$. The opposing magnetic fluxes partially cancel each other, reducing the magnetic stored energy, $W_m$, resulting in a smaller effective inductance for the system and, thus, a higher resonant frequency.

Figure 4:
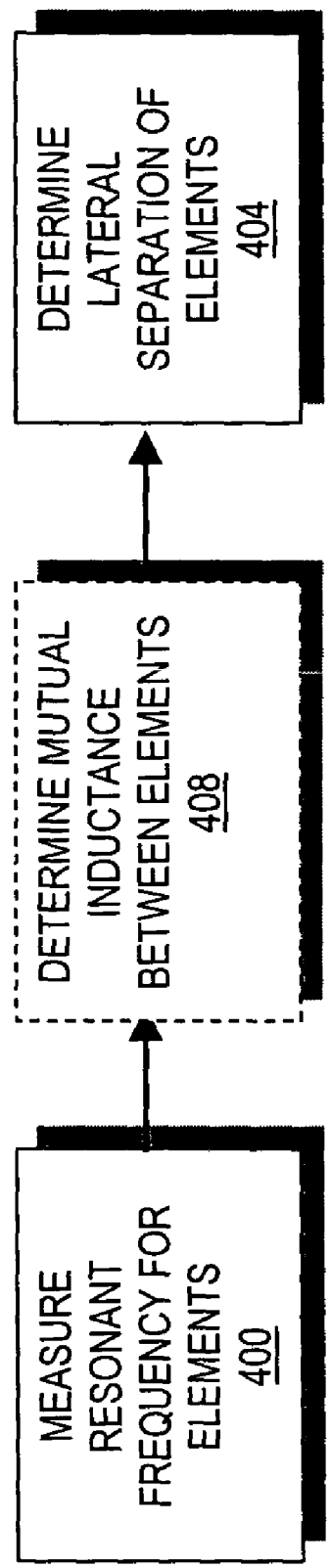
FIG. 4 is a flowchart illustrating a method to determine the lateral separation of a pair of objects labeled with resonant tags in accord with the present invention.

FIG. 4 presents a flowchart of a method for determining the lateral separation, d, between two resonant elements $104_1$, $104_2$. In some embodiments, this method is performed using application-specific circuits or special-purpose computers. In other embodiments, this method is performed using one or more general purpose computers executing software providing this functionality.

In a first embodiment, the resonant elements $104_1$, $104_2$ are arranged as depicted in FIG. 3 and several measurements of resonant frequency, $\omega$, are taken as the lateral separation, d, between the elements $104_1$, $104_2$ is varied. With these measurements, an appropriate function is identified that specifies the lateral separation, d, between the elements $104_1$, $104_2$ as a function of resonant frequency, $\omega$, using, for example, regression analysis. In subsequent operation, a measurement of resonant frequency, $\omega$, (Step 400) for a pair of tags separated by an unknown lateral separation, d, is provided as an input to the function, yielding a value for d (Step 404).

In a second embodiment, a measurement of resonant frequency, $\omega_0$, is taken for a resonant element $104_N$. In subsequent operation, a measurement of resonant frequency, $\omega$, (Step 400) for a pair of tags $104_1$, $104_2$ separated by an unknown lateral separation, d, is provided as an input to Eq. 8. The baseline resonant frequency, $\omega_0$, and the actual measured resonant frequency of the tag system, $\omega$, (Step 400) are used to solve for $M_2$, the mutual inductance between the resonant elements $104_1$, $104_2$ (Step 408) using Eq. 8. The lateral separation, d, between the elements $104_1$, $104_2$ is determined using the value of the mutual inductance, either computationally from a model or by consulting a lookup table specifying predetermined paired values of $M_2$ and d (Step 404).

In a third embodiment, it is assumed that each resonant tag $104_N$ has an inductance substantially equal to L, and the resonant frequency, $\omega_0$, for a single tag $104_N$ is computed using the physical parameters of the tag. The computed resonant frequency, $\omega_0$, and the actual measured resonant frequency of the tag system, $\omega$, (Step 400) are provided as inputs to Eq. 8 and are subsequently used to solve for $M_2$, the mutual inductance between the resonant elements $104_1$, $104_2$ (Step 408). Using the value of the mutual inductance, the lateral separation, d, between the elements $104_1$, $104_2$ is determined, either deterministically, iteratively, or by consulting a lookup table specifying predetermined paired values of $M_2$ and d (Step 404).

Axial (Perpendicular) Positioning

Figure 5:
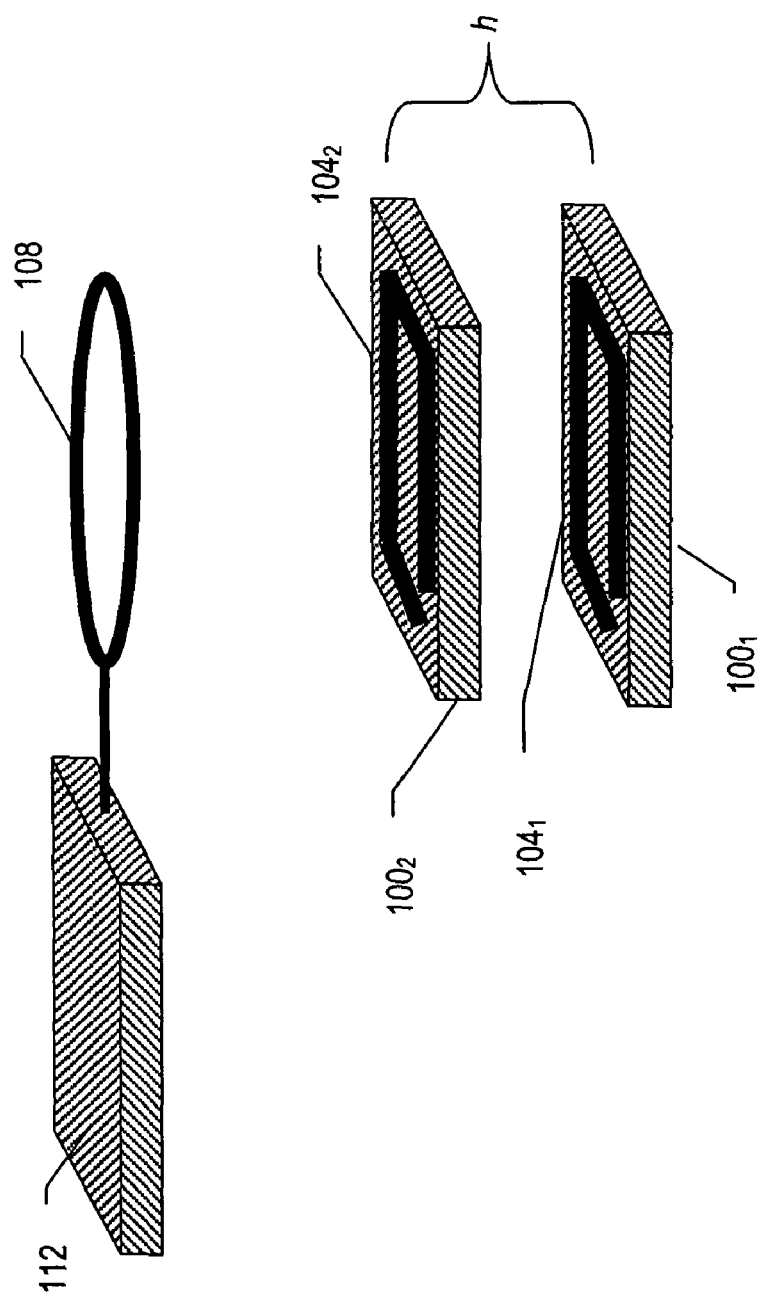
FIG. 5 illustrates an embodiment of the present invention utilizing an antenna to determine the axial separation between a pair of objects labeled with resonant tags.

Referring to FIG. 5, it is also possible to use the shift in resonant frequency to ascertain the axial separation, h, between two or more tags $104_N$, for example, to determine the separation between the faces of two toy building blocks.

Since the mutual inductance, $M_2$, between any two tags $104_1$, $104_2$ is a nonlinear function of the axial separation, h, between the tags $104_1$, $104_2$, the measured resonant frequency, $\omega$, is also a function of this separation. This measurement is particularly useful when the axial separation, h, is less than three times the diameter of the object $100_N$, whereupon so that the mutual inductance between tags $104_N$ produces a change in the observed resonant frequency, $\omega$, of at least a few percent. In a typical embodiment, the diameter of the reader antenna 108 is considerably larger than the diameter of the resonant tags $104_N$, so it may be assumed that, $M_1$, the mutual inductance between the reader antenna 108 and the tags $104_N$ remains roughly constant throughout the operating distance of the tags.

Figure 6:
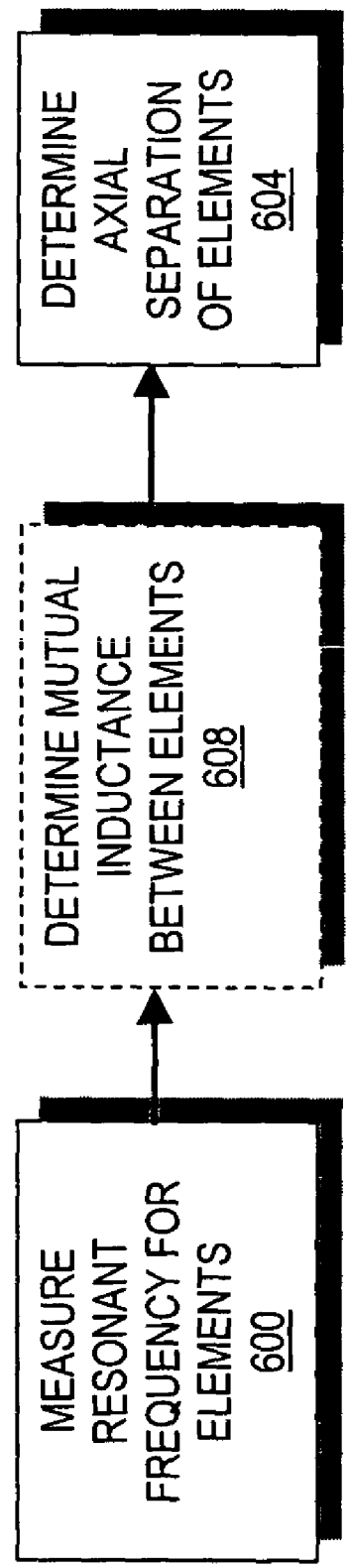
FIG. 6 is a flowchart illustrating a method for determining the axial separation of a pair of objects labeled with resonant tags in accord with the present invention.

FIG. 6 presents a flowchart of a method for determining the axial separation, h, between two resonant elements $104_1$, $104_2$. In some embodiments, this method is performed using application-specific circuits or special-purpose computers. In other embodiments, this method is performed using one or more general purpose computers executing software providing this functionality.

In a first embodiment, the resonant elements $104_1$, $104_2$ are arranged as depicted in FIG. 5 and several measurements of resonant frequency, $\omega$, are taken as the axial separation, h, between the elements $104_1$, $104_2$ is varied. With these measurements, an appropriate function is identified that specifies the axial separation, h, between the elements $104_1$, $104_2$ as a function of resonant frequency, $\omega$, using, for example, regression analysis. In subsequent operation, a measurement of resonant frequency, $\omega$, (Step 600) for a pair of tags separated by an unknown axial separation, h, is provided as an input to the function, yielding a value for h (Step 604).

In a second embodiment, a measurement of resonant frequency, $\omega_0$, is taken for a resonant element $104_N$. In subsequent operation, a measurement of resonant frequency, $\omega$, (Step 600) for a pair of tags $104_1$, $104_2$ separated by an unknown axial separation, h, is provided as an input to Eq. 8. The baseline resonant frequency, $\omega_0$, and the actual measured resonant frequency of the tag system, $\omega$, (Step 600) are used to solve for $M_2$, the mutual inductance between the resonant elements $104_1$, $104_2$ (Step 608) using Eq. 8. The axial separation, h, between the elements $104_1$, $104_2$ is determined using the value of the mutual inductance, either computed from a model or by consulting a lookup table specifying predetermined paired values of $M_2$ and h (Step 604).

In a third embodiment, it is assumed that each resonant tag $104_N$ has an inductance substantially equal to L, and the resonant frequency, $\omega_0$, for a single tag $104_N$ is computed using the physical parameters of the tag. The computed resonant frequency, $\omega_0$, and the actual measured resonant frequency of the tag system, $\omega$, (Step 600) are provided as inputs to Eq. 8 and are subsequently used to solve for $M_2$, the mutual inductance between the resonant elements $104_1$, $104_2$ (Step 608). Using the value of the mutual inductance, the axial separation, h, between the elements $104_1$, $104_2$ is determined, either deterministically, iteratively, or by consulting a lookup table specifying predetermined paired values of $M_2$ and h (Step 604).

Counting Resonant Tags

Figure 7:
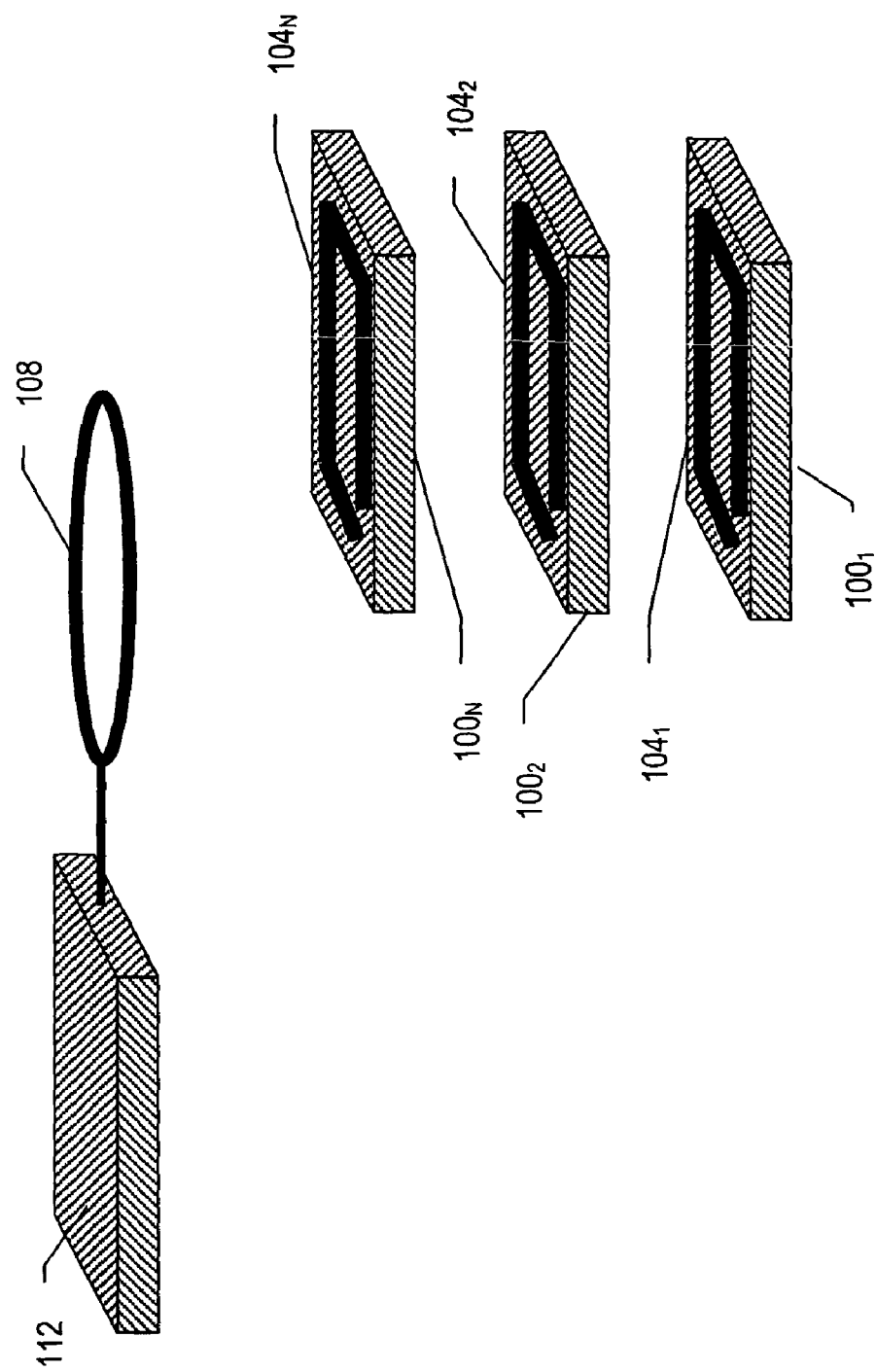
FIG. 7 illustrates an embodiment of the present invention utilizing an antenna to determine the number of stacked objects labeled with resonant tags.

In the case of identical resonant tags $104_N$ having inductance L, it is also possible to use the measured shift in resonant frequency to determine the number of tags $104_N$ present, for example, to count the number of tagged greeting cards in a stack of cards. If it is possible to maintain a substantially consistent spacing between the resonant elements $104_N$, by stacking them on top of each other or placing them at fixed, consistently spaced locations as illustrated in FIG. 7, then the additional mutual inductance, $M_2$, presented by each tag $104_N$ is roughly constant, resulting in a relationship between resonant frequency and item count such that:

$$\omega^2 = \omega_0^2 \left( \frac{L^2}{L^2 - ((n-1)M_2)^2} \right) \quad \text{(Eq. 14)}$$

where n is the item count.

FIG. 8 presents a flowchart of a method for determining, n, the number of resonant tags $104_N$. In some embodiments, this method is performed using application-specific circuits or special-purpose computers. In other embodiments, this method is performed using one or more general purpose computers executing software providing this functionality.

In a first embodiment, the resonant elements 104 are arranged as depicted in FIG. 7 and several measurements of resonant frequency, $\omega$, are taken as the number of resonant elements, n, is varied. With these measurements, an appropriate function is identified that specifies the number of resonant elements, n, as a function of resonant frequency, $\omega$, using, for example, regression analysis. In subsequent operation, a measurement of resonant frequency, $\omega$, (Step 800) for a set of tags of unknown number, n, is provided as an input to the function, yielding a value for d (Step 804).

In a second embodiment, a measurement of resonant frequency, $\omega_0$, is taken for a single tag $104_N$. In subsequent operation, a measurement of resonant frequency, $\omega$, (Step 800) for a set of tags of unknown number, n, is provided as an input to a formula derived from a circuit model such as Eq. 14. The baseline resonant frequency, $\omega_0$, and the actual measured resonant frequency of the tag system, $\omega$, (Step 800) are used to solve for n, the number of resonant elements (Step 804) using Eq. 14.

In a third embodiment, it is assumed that each resonant tag $104_N$ has an inductance substantially equal to L, and the resonant frequency, $\omega_0$, for a single tag $104_N$ is computed using the physical parameters of the tag. The computed resonant frequency, $\omega_0$, and the actual measured resonant frequency of the tag system, $\omega$, (Step 800) are provided as inputs to Eq. 14 and are subsequently used to solve for n, the number of resonant elements (Step 804).

As the number of tags $104_N$ increases, conducting losses and AC losses may cause the change in frequency shift to deviate from the baseline specified by Eq. 14, producing a progressively smaller frequency shift as more resonant elements $104_N$ are added. Errors in the frequency shift due to lateral misalignment of the tagged items $100_N$ may be reduced by increasing the size of the tag $104_N$ or, in certain embodiments, by increasing the size of the resonant element coil.

Many alterations and modifications may be made without departing from the spirit and scope of the invention. For example, other configurations of resonant elements may be analyzed as a combination of a lateral position (as shown in FIG. 3) and an axial position (as shown in FIG. 5). Therefore, it is to be understood that these embodiments have been shown by way of example and should not be taken as limiting the invention, which is defined by the following claims. These claims are thus to be read as not only including literally what is set forth by the claims but also to include those equivalents which are insubstantially different, even though not identical in other respects to what is shown and described in the above illustrations.

What is claimed is:

1. A method for determining at least one property of a set of tags, each tag having at least one resonant element, the method comprising:
    (a) having at least one reference frequency, $\omega_0$, common to the tags;
    (b) measuring the resulting resonant frequency, $\omega$, of the set of interacting tags; and
    (c) determining the property using the frequency shift between the measured frequency and the reference frequency.

2. The method of claim 1 wherein the property determined is the number of tags in the set, n.

3. The method of claim 2 wherein the reference resonant frequency is measured.

4. The method of claim 2 wherein the reference resonant frequency is computed from at least one of the known geometry and the physical dimensions of a tag.

5. The method of claim 2 wherein each tag comprises one or more resonant elements.

6. The method of claim 2 wherein each tag is identical to the other tags of the set.

7. The method of claim 2 wherein the set of tags comprises multiple subsets of resonant elements, each subset of resonant elements having its own resonant frequency.

8. The method of claim 2 wherein each tag is affixed to a movable object.

9. The method of claim 2 wherein the set of tags is arranged in a stack.

10. The method of claim 9 wherein pairs of adjacent tags in the stack have a substantially equal spacing.

11. The method of claim 2 wherein n is a monotonic function of the measured resonant frequency.

12. The method of claim 2 wherein each tag present has an inductance, L, and the number of tags present is given by a value substantially equal to $$\sqrt{\frac{L^2(\omega^2 - \omega_0^2)}{\omega^2 M^2}} + 1,$$

where Ad is the mutual inductance between the individual tags.

13. The method of claim 2 wherein the reference frequency is provided as a regression-fit function to a plurality of empirical measurements of the number of tags in a test set and the resonant frequency of the test set.

14. The method of claim 2 wherein the reference frequency is provided as a value determined from at least one measurement of a single tag.

15. The method of claim 2 wherein the reference frequency is provided as a value determined from at least one measurement of a plurality of tags.

16. The method of claim 2 wherein the reference frequency is provided as a value computed from the known geometry and dimensions of each tag in the set.

17. The method of claim 1 wherein the property determined is the separation between a pair of tags in the set.

18. The method of claim 17 wherein the separation is a lateral distance.

19. The method of claim 17 wherein the separation is an axial distance.

20. The method of claim 17 wherein each tag is affixed to a movable object.

21. The method of claim 17 wherein the reference frequency is provided as a regression-fit function to a plurality of empirical measurements of the seperation between a test pair of tags and the resonant frequency of the test pair.

22. The method of claim 17 wherein the reference frequency is provided as a value determined from at least one measurement of a single tag.

23. The method of claim 17 wherein the reference frequency is provided as a value determined from at least one measurement of a plurality of tags.

24. The method of claim 17 wherein the reference frequency is provided as a value computed from known parameters of a resonant element in the set.

25. The method of claim 17 wherein determining the separation comprises determining the mutual inductance between the pair of tags and determining the Separation using the mutual inductance.

26. An apparatus fur determining at least one property of a set of tags, each tag having at least one resonant element, the apparatus comprising:
    (a) a source providing at least one reference frequency, $\omega_0$, common to the tags;
    (b) a sensor fur measuring the resulting resonant frequency, $\omega$, of the set of interacting tags; and
    (c) a computational element for determining the property using the frequency shift between the measured frequency and the reference frequency.

27. The apparatus of claim 26 wherein the property determined is the number of tags in the set, n.

28. The apparatus of claim 27 wherein the reference resonant frequency is measured.

29. The apparatus of claim 27 wherein the reference resonant frequency is computed from at least one of the known geometry and the physical dimensions of a tag.

30. The apparatus of claim 27 wherein each tag comprises one or more resonant elements.

31. The apparatus of claim 27 wherein each tag is identical to the other tags of the set.

32. The apparatus of claim 27 wherein the set of tags comprises multiple subsets of resonant elements, with each subset of resonant elements having its own resonant frequency.

33. The apparatus of claim 27 wherein each tag is affixed to a movable object.

34. The apparatus of claim 27 wherein the set of tags is arranged in a stack.

35. The apparatus of claim 34 wherein pairs of adjacent tags in the stack have a substantially equal spacing.

36. The apparatus of claim 27 wherein n is a monotonic function of the measured resonant frequency.

37. The apparatus of claim 27 wherein each tag present bas an inductance, L, and the number of tags present is given by a value substantially equal to $$\sqrt{\frac{L^2(\omega^2 - \omega_0^2)}{\omega^2 M^2}} + 1,$$

where M is the mutual inductance between the individual tags.

38. The apparatus of claim 27 wherein the reference frequency is provided as a regression-fit function to a plurality of empirical measurements of the number of tags in a test set and the resonant frequency of the test set.

39. The apparatus of claim 27 wherein the reference frequency is provided as a value determined from at least one measurement of a single tag.

40. The apparatus of claim 27 wherein the reference frequency is provided as a value determined from at least one measurement of a plurality of tags.

41. The apparatus of claim 27 wherein the reference frequency is provided as a value computed from known parameters of a resonant element in the set.

42. The apparatus of claim 26 wherein the property determined is the separation between a pair of tags in the set.

43. The apparatus of claim 42 wherein the separation is a lateral distance.

44. The apparatus of claim 42 wherein the separation is an axial distance.

45. The apparatus of claim 42 wherein each tag is affixed to a movable object.

46. The apparatus of claim 42 wherein the reference frequency is provided as a regression-fit function to a plurality of empirical measurements of the separation between a test pair of tags and the resonant frequency of the test pair.

47. The apparatus of claim 42 wherein the reference frequency is provided as a value determined from at least one measurement of a single tag.

48. The apparatus of claim 42 wherein the reference frequency is provided as a value determined from at least one measurement of a plurality of tags.

49. The apparatus of claim 42 wherein the reference frequency is provided as a value computed from known parameters of a resonant element in the set.

50. The apparatus of claim 42 wherein the computational element determines the mutual inductance between the pair of tags and determines the separation using the mutual inductance.

* * * * *